US012759081B2

(12) United States Patent
Jiang et al.

(10) Patent No.: US 12,759,081 B2
(45) Date of Patent: Oct. 13, 2026

(54) METHOD AND SYSTEM FOR OPTIMIZING PROCESS PARAMETERS FOR PORE INHIBITION IN HIGH-POWER LASER SHAPING WELDING

(71) Applicant: Huazhong University of Science and Technology, Wuhan (CN)

(72) Inventors: Ping Jiang, Wuhan (CN); Shaoning Geng, Wuhan (CN); Leshi Shu, Wuhan (CN); Jianmin Li, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 19/033,372

(22) Filed: Jan. 21, 2025

(65) Prior Publication Data

US 2025/0289078 A1 Sep. 18, 2025

(30) Foreign Application Priority Data

Mar. 15, 2024 (CN) ......................... 202410299181.6

(51) Int. Cl.
*B23K 26/342* (2014.01)
*B23K 26/062* (2014.01)
*B23K 26/073* (2006.01)

(52) U.S. Cl.
CPC ........ *B23K 26/342* (2015.10); *B23K 26/0626* (2013.01); *B23K 26/0734* (2013.01)

(58) Field of Classification Search
CPC ............ B23K 26/0604; B23K 26/0608; B23K 26/0613; B23K 26/0626; B23K 26/0648; B23K 26/0734; B23K 26/21; B23K 26/24; B23K 26/244; B23K 2103/08; B23K 2103/10
See application file for complete search history.

(56) References Cited

U.S. PATENT DOCUMENTS

2010/0206857 A1 8/2010 Bea et al.
2018/0221988 A1* 8/2018 Liu .................... B23K 26/0624
(Continued)

OTHER PUBLICATIONS

Title of the Item: ISO 11146-1:2021 Publication Date: Jul. 2021Technical Committee: ISO/TC 172/SC 9Pages: 17.

*Primary Examiner* — Edward F Landrum
*Assistant Examiner* — Theodore J Evangelista
(74) *Attorney, Agent, or Firm* — George D. Morgan

(57) ABSTRACT

The disclosure belongs to the technical field of high-power laser welding, and discloses a method and system for optimizing process parameters to suppress pores in high-power laser shaping welding. The method includes: obtaining the relationship between the adjustable annular laser beam diameter, the linear energy at the center point, with welding process parameters; and establishing optimization constraint conditions for them; obtaining the preset range of process parameters and substituting parameter values within this range into the optimization constraint conditions; the process parameter combinations that meet both optimization constraint conditions are the optimized process parameters. This disclosure, by flexibly adjusting the power ratio of the central Gaussian beam and the outer annular beam, significantly improves the pore problem in laser welding of aluminum alloys while ensuring large penetration depth, providing reference for high-quality welding of aluminum alloys.

4 Claims, 11 Drawing Sheets

(56) References Cited

U.S. PATENT DOCUMENTS

| | | | | |
|---|---|---|---|---|
| 2021/0354246 | A1 | 11/2021 | Dais et al. | |
| 2021/0362271 | A1 | 11/2021 | Brescoe | |
| 2024/0253156 | A1* | 8/2024 | Bocksrocker ...... | B23K 26/0673 |

* cited by examiner

METHOD AND SYSTEM FOR OPTIMIZING PROCESS PARAMETERS FOR PORE INHIBITION IN HIGH-POWER LASER SHAPING WELDING

CROSS-REFERENCE TO RELATED APPLICATIONS

The application claims priority to Chinese patent application No. 202410299181.6, filed on Mar. 15, 2024, the entire contents of which are incorporated herein by reference.

TECHNICAL FIELD

The present disclosure belongs to the technical field of high-power laser welding and particularly relates to a method and system for optimizing process parameters for pore inhibition in high-power laser shaping welding.

BACKGROUND

At present, medium-thick wall aluminum alloy components have the advantages of low density, high specific strength, etc., and are widely applied in the fields of rail transportation, aerospace, etc. High-power laser welding technology has characteristics of high energy density, small heat input, and good flexibility, which provides an effective means for efficient welding of the medium and thick-wall aluminum alloy components. However, the problem of prominent porosity defects still persists in the welding process. These pores are mostly caused by the keyhole collapse during the laser deep penetration welding process. In recent years, the laser beam shaping technology has been used in the context of engineering light-matter interactions to solve shortcomings of using the focused Gaussian beam for metal in laser manufacturing. Among them, the adjustable annular laser has gained extensive attention. The core idea of adjustable annular laser welding technology is to introduce an annular laser beam based on high-power (Gaussian spot) laser welding to regulate the spatial distribution of laser energy. Research has shown that the use of the adjustable annular laser may improve the stability of laser welding process over a wider range of process parameters compared to the Gaussian beam. However, due to the novelty of this type of laser, the research foundation for its application in welding field is weak, there are few reports on inhibiting pores, and no systematic pore improvement solution has been formed.

With the above analysis, the problems and defects of the prior art are as follows.

(1) The problem of pore defects is particularly prominent in the high-power laser welding process, especially when welding high-thermal conductivity and high antimetals such as aluminum alloys. Most of these pores are caused by keyhole collapses in laser deep penetration welding process.

(2) The conventional Gaussian beam has limitations in energy distribution regulation. During Gaussian laser welding process, energy is mainly concentrated in the center region of the beam, resulting in a large thermal gradient, which easily leads to unstable welding processes and frequent keyhole collapses.

(3) Due to the novelty of the shaping laser beam of the prior art, the research foundation for the application in the welding field is weak. There are few reports on pore suppression, and no systematic pore improvement solution has been formed.

SUMMARY

Aiming at the problems existing in the prior art, the present disclosure provides a method and system for optimizing process parameters for pore inhibition in high-power laser shaping welding.

The present disclosure is realized in such a way that a method for optimizing process parameters for pore inhibition in high-power laser shaping welding includes:

a first step, obtaining a relationship between an adjustable annular laser beam diameter as well as center point linear energy and the welding process parameters;

a second step, establishing optimization constraint conditions for the adjustable annular laser beam diameter and the center point linear energy; and obtaining preset ranges of the process parameters; and a third step, substituting process parameter values within the preset ranges into the optimization constraint conditions for the adjustable annular laser beam diameter and the center point linear energy, and then combining the process parameters that simultaneously satisfy the optimization constraint conditions for the adjustable annular laser beam diameter and the center point linear energy as optimized process parameters.

Further, the process parameters include laser power, welding speed, and the point-ring laser power ratio.

Further, a reference ISO 11146-1:2021(en) standard for the relationship between the beam diameter of the adjustable annular laser and the welding process parameters is obtained. For any types of laser beam, D4σ is defined as the beam diameter. A calculation method is to solve a second-order moment of an intensity distribution function by using laser beam intensity information. Detailed calculation steps are as follows:

obtaining a light intensity distribution E (x, y) of an entire adjustable annular beam by adding the center Gaussian beam of intensity $E_c$(x,y) and an outer ring annular beam of light intensity $E_r$ (x, y).

$$E(x, y) = E_c(x, y) + E_r(x, y)$$

Center coordinates ($x_c$, $y_c$) of the beam could be calculated as follows:

$$x_c = \frac{\int_{-\infty}^{\infty}\int_{-\infty}^{\infty} x \cdot E(x, y)dxdy}{\int_{-\infty}^{\infty}\int_{-\infty}^{\infty} E(x, y)dxdy}$$

$$y_c = \frac{\int_{-\infty}^{\infty}\int_{-\infty}^{\infty} y \cdot E(x, y)dxdy}{\int_{-\infty}^{\infty}\int_{-\infty}^{\infty} E(x, y)dxdy}$$

$$\sigma_x^2$$

And $$\sigma_y^2$$

represent normalized weighted integrals of a power density distribution, and a calculation formula is as follows:

$$\sigma_x^2 = \frac{\int_{-\infty}^{\infty}\int_{-\infty}^{\infty}(x-x_c)^2 E(x, y)dxdy}{\int_{-\infty}^{\infty}\int_{-\infty}^{\infty}E(x, y)dxdy}$$

$$\sigma_y^2 = \frac{\int_{-\infty}^{\infty}\int_{-\infty}^{\infty}(y-y_c)^2 E(x, y)dxdy}{\int_{-\infty}^{\infty}\int_{-\infty}^{\infty}E(x, y)dxdy}$$

For a Gaussian beam with (0,0) as a center and a radius w, the formula is as follows:

$$\sigma_x^2 = \frac{\int_{-\infty}^{\infty}\int_{-\infty}^{\infty}x^2 e^{-2(x^2+y^2)/w^2}dxdy}{\int_{-\infty}^{\infty}\int_{-\infty}^{\infty}e^{-2(x^2+y^2)/w^2}dxdy} = \frac{w^2}{4}$$

Therefore, a beam radius used by ISO 11146-1:2021(en) is defined as:

$$w = 2\sigma_x$$

The beam diameter D4σ is twice the above beam radius, and an expression is as follows:

$$D4\sigma = 2w$$

Further, a step of obtaining the relationship between the linear energy at the center point and the welding process parameters is:

obtaining the center point linear energy, wherein an expression for the center point linear energy q is:

$$q = \frac{P_c}{v}$$

where $P_c$ is laser power of a center point light source, and v is the welding speed.

An optimization constraint condition for a ratio of penetration to the beam diameter is:

$$\frac{h}{M_{col} * M_{focus} * D4\sigma} < 6.5$$

where h is preset target penetration, $M_{col}$ represents a collimation coefficient, and $M_{focus}$ represents a focus imaging ratio.

Further, an optimization constraint condition for the beam diameter D4σ is:

$$D4\sigma > \frac{h}{M_{col} * M_{focus} * 6.5}$$

An optimization constraint condition for the center point linear energy is:

$$q_{min} < q < q_{max}$$

where $q_{min}$ and $q_{max}$ are maximum and minimum center point linear energy under an empirical condition.

Further, in the method for optimizing the process parameters for pore inhibition in high-power laser shaping welding, the preset ranges of the process parameters are obtained according to a working interval of each parameter of a welding system or process requirements; and The process parameter values are input into the optimization constraint conditions, the process parameters are retained when they simultaneously satisfy the optimization constraint conditions for the adjustable annular laser beam diameter and the center point linear energy, otherwise they are discarded, and the next group of process parameters are verified.

Another objective of the present disclosure is to provide a system for optimizing process parameters for pore inhibition in high-power laser shaping welding based on the method for optimizing the process parameters for pore inhibition in high-power laser shaping welding. The system for optimizing the process parameters for pore inhibition in high-power laser shaping welding includes:

a parameter obtaining module, configured to obtain a relationship between an adjustable annular laser beam diameter as well as center point linear energy and welding process parameters;

a condition establishing module, configured to establish optimization constraint conditions for the adjustable annular laser beam diameter and the center point linear energy; and configured to obtain preset ranges of the process parameters; and a condition optimizing module, configured to substitute process parameter values within the preset ranges into the optimization constraint conditions for the adjustable annular laser beam diameter and the center point linear energy, and then combine the process parameters that simultaneously satisfy the optimization constraint conditions for the adjustable annular laser beam diameter and the center point linear energy as optimized process parameters.

By combining the foregoing technical solution and the technical problem to be solved, the technical solutions claimed by the present disclosure have the advantages and positive effects as follows:

first, the present disclosure proposes an aluminum alloy laser welding technology based on an adjustable annular laser, which does not require complex external tools, and by flexibly adjusting the power ratio of the center point Gaussian beam and the outer annular beam, significantly solves the problem of pores generated by laser welding of an aluminum alloy under the premise of guaranteeing large penetration, which may provide a reference for high-quality welding of the aluminum alloy.

Second, the present disclosure starts from the stability of keyhole, the ratio of the penetration to the beam diameter is as an index for characterizing porosity, the center point linear energy of a weld seam is used as an index for evaluating the penetration, and the ratio of the penetration to the beam diameter and the center point linear energy are used to establish a correlation relationship with the process parameters to be optimized. By controlling the ratio of the penetration to the beam diameter and the constraint conditions for the center point linear energy, constraints on the process parameters are realized, thus obtaining a plurality of groups of optimal process parameters, which may be used directly in engineering applications to realize the precise control of the beam diameter and the beam spatial energy distribution, inhibit the generation of pores in the welding process, and ultimately realize the welding with fewer pores.

The present disclosure may precisely control the center energy distribution of the laser beam in the welding process, which may realize the prediction of the penetration of the weld seam of a welding joint, and obtain the penetration that satisfies the application requirements. The adjustable annular laser welding is different from single laser welding, the addition of the annular beam may achieve the effect of expanding an opening area of the welding keyhole, thereby reducing bubbles formed by closed collapses of the keyhole in the process of deep penetration welding. And at the same time the molten pool is enlarged, and solidification time of the molten pool is prolonged to provide more time for the bubbles to escape, which reduces the formation of pores caused by the bubbles solidifying in the weld seam.

The present disclosure may obtain the process parameters for fewer pores and large penetration without extensive process experiments, and the method of the present disclosure may be used to optimize process parameters only with the penetration depth of the weld seam, which is easy to operate and significantly shortens a process design cycle.

The technical solution of the present disclosure contains a set of systematic solutions for improving pores in the process of high-power laser welding, which may effectively solve the prominent problem of pore defects faced by aluminum alloy medium-thick wall components for a long time under the premise of ensuring the large penetration, and fills the research gap of improving pores in high-power laser shaping welding.

Third, the advantages and positive technical effects of the present disclosure are also embodied in:

The effect of pore inhibition is remarkable: the present disclosure significantly reduces the pore defects in the aluminum alloy welding process by optimizing the process parameters, thus improving the quality and reliability of the welding joint.

Welding efficiency is improved: by precisely controlling the laser energy distribution and welding parameters, the present disclosure not only improves the welding quality, but also helps to increase the welding efficiency.

Applicability is wide: optimized steps and standardized measurement means of the method make it widely applied to the welding of different types of aluminum alloy medium-thick wall components, which has high practicality and universality.

Systematization of the optimization of the process parameters is realized: the present disclosure provides a systematized method for optimizing the process parameters, allowing adjustment and optimization according to specific application requirements, and providing a more flexible and efficient welding process option.

DETAILED DESCRIPTION OF THE EMBODIMENTS

Figure 1:
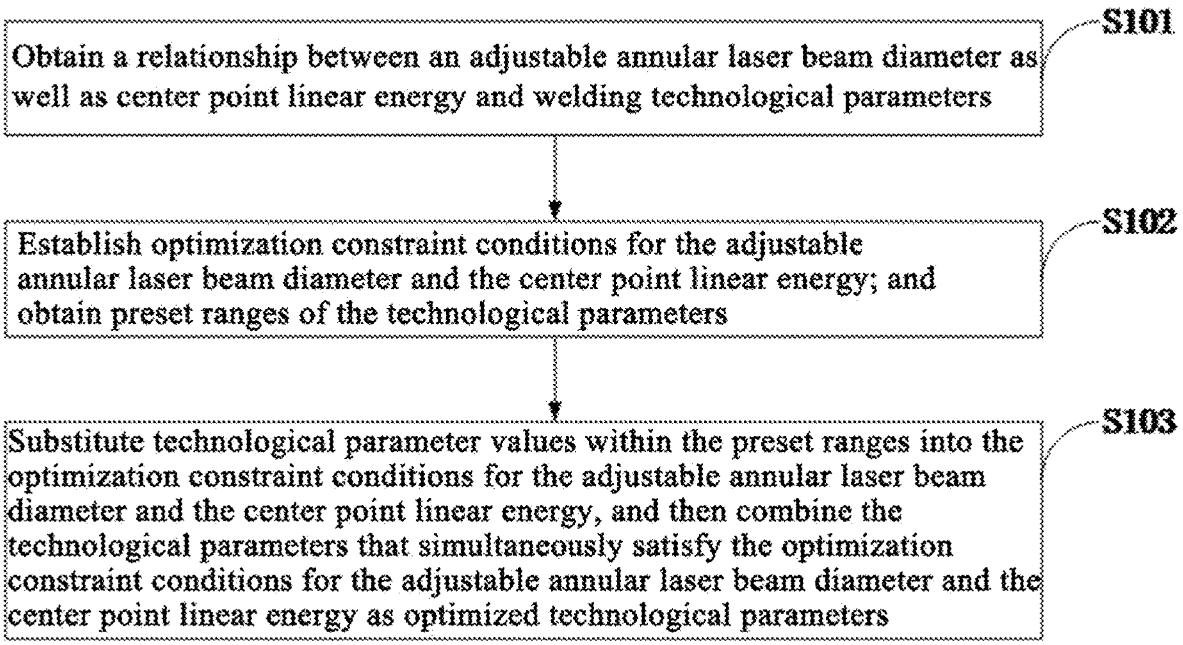
FIG. 1 is a flowchart of a method for optimizing process parameters for pore inhibition in high-power laser shaping welding provided by an embodiment of the present disclosure.

To make the objective, technical solutions, and advantages of the present disclosure clearer and more comprehensible, the present disclosure will be further described below in detail in conjunction with embodiments. It should be appreciated that the specific example described herein is only intended to explain the present disclosure and is not intended to limit the present disclosure.

The present disclosure makes improvements mainly for the following problems and defects of the prior art and realizes significant technical progress.

The solution to the problem of pores defects: by optimizing an adjustable annular laser beam diameter and center point linear energy, the present disclosure directly targets key factors for the formation of pores to perform adjustment and control, to effectively inhibit the generation of pores.

Energy distribution control: by establishing optimization constraint conditions for the adjustable annular laser beam diameter and the center point linear energy, the present disclosure realizes the precise control of laser energy distribution and improves the problem of uneven energy distribution in conventional Gaussian beam welding.

Improvement of stability of a welding process: by optimizing the process parameters, such as laser power, welding speed, and the point-ring laser power ratio, the present disclosure improves the stability of the welding process and thus reduces welding defects.

Precise calculation of beam diameter: an ISO 11146-1:2021(en) standard is used to obtain a relationship between the adjustable annular laser beam diameter and the welding process parameters, which ensures the accuracy and consistency of a beam measurement.

Two specific embodiments of embodiments of the present disclosure are as follows.

Embodiment 1-precise welding of an aluminum alloy carriage of a high-speed train Adjustment of welding parameters: first, the welding parameters (laser power, the welding speed, and the point-ring laser power ratio) are precisely adjusted for a specific aluminum alloy material and structural requirements for the carriage of the high-speed train. Such an adjustment is based on the thickness, shape, and expected bearing capacity of an aluminum alloy panel of the carriage.

Application of an adjustable annular laser welding technology: the adjustable annular laser technology is used, so that the stability of a keyhole in the welding process is effectively improved by precisely controlling the adjustable annular laser beam diameter and the center point linear energy. This helps to reduce pores and other defects in the welding process.

Optimization of the shape of a weld seam: due to the high requirements of the high-speed train for aerodynamic performance, smoothness and uniformity of the weld seam are crucial. The adjustable annular laser welding technology can realize a finer and smoother weld seam, which is beneficial for reducing wind resistance.

Quality monitoring and evaluation: in the welding process, the welding parameters and the shape of the weld seam are monitored in real-time to ensure that the welding quality satisfies the safety and performance standards of the high-speed train.

Embodiment 2-high-precision welding of an aluminum alloy bracket for a spacecraft Parameter optimization under an extreme environment: considering that the spacecraft operates in the environment with an extreme temperature and pressure, the welding parameters (laser power, welding speed, and point-ring laser power ratio) need to be rigorously optimized for these conditions. This includes fine adjustments of a laser energy distribution and a thermal input to adapt to the characteristics of the aluminum alloy bracket.

Complex structure welding technology: a complex seam of the aluminum alloy bracket of the spacecraft is processed by using an adjustable annular laser welding technology. This technology can flexibly adapt to an irregular path of the weld seam and a complex geometry while maintaining the uniformity and strength of the weld seam.

Quality guarantee for high load welding: to ensure that the welded part can withstand a high load and a strong vibration, special attention is paid to the inhibition of pores and defects in the welding process. This is realized by precisely controlling the welding parameters and monitoring the formation process of the weld seam in real-time.

Evaluation and testing of a welding effect: after the welding is completed, the welding joint is subjected to a rigorous quality evaluation, including a fatigue-resistant test and a structural integrity check, to ensure that it satisfies the strict requirements of the spacecraft.

As shown in FIG. 1, a method for optimizing process parameters for pore inhibition in high-power laser shaping welding provided by an embodiment of the present disclosure includes the following steps.

S101: a relationship between an adjustable annular laser beam diameter as well as center point linear energy and the welding process parameters is obtained.

S102: optimization constraint conditions for the adjustable annular laser beam diameter and the center point linear energy are established; and preset ranges of the process parameters are obtained.

S103: process parameter values within the preset ranges are substituted into the optimization constraint conditions for the adjustable annular laser beam diameter and the center point linear energy, and then the process parameters that simultaneously satisfy the optimization constraint conditions for the adjustable annular laser beam diameter and the center point linear energy are combined as optimized process parameters.

In the embodiment of the present disclosure, the process parameters include laser power, welding speed, and point-ring laser power ratio.

In the embodiment of the present disclosure, a reference ISO 11146-1:2021(en) standard for the relationship between the adjustable annular laser beam diameter and the welding process parameters is obtained. For any spot laser beam, D4σ is defined as a beam diameter. A calculation method is to solve a second-order moment of an intensity distribution function by using laser beam intensity information. Detailed calculation steps are as follows:

obtaining a light intensity distribution E (x, y) of an entire adjustable annular beam by adding a center Gaussian beam of intensity $E_c(x, y)$ and an outer ring annular beam of intensity $E_r(x, y)$.

$$E(x, y) = E_c(x, y) + E_r(x, y)$$

Center coordinates $(x_c, y_c)$ of the beam may be calculated as follows:

$$x_c = \frac{\int_{-\infty}^{\infty}\int_{-\infty}^{\infty} x \cdot E(x, y)dxdy}{\int_{-\infty}^{\infty}\int_{-\infty}^{\infty} E(x, y)dxdy}$$

$$y_c = \frac{\int_{-\infty}^{\infty}\int_{-\infty}^{\infty} y \cdot E(x, y)dxdy}{\int_{-\infty}^{\infty}\int_{-\infty}^{\infty} E(x, y)dxdy}$$

$$\sigma_x^2$$

And $$\sigma_y^2$$

represent normalized weighted integrals of a power density distribution, and a calculation formula is as follows:

$$\sigma_x^2 = \frac{\int_{-\infty}^{\infty}\int_{-\infty}^{\infty} (x - x_c)^2 E(x, y)dxdy}{\int_{-\infty}^{\infty}\int_{-\infty}^{\infty} E(x, y)dxdy}$$

-continued $$\sigma_y^2 = \frac{\int_{-\infty}^{\infty}\int_{-\infty}^{\infty}(y-y_c)^2 E(x, y)dxdy}{\int_{-\infty}^{\infty}\int_{-\infty}^{\infty}E(x, y)dxdy}$$

For a Gaussian beam with (0,0) as a center and a radius w, a formula is as follows:

$$\sigma_x^2 = \frac{\int_{-\infty}^{\infty}\int_{-\infty}^{\infty}x^2 e^{-2(x^2+y^2)/w^2}dxdy}{\int_{-\infty}^{\infty}\int_{-\infty}^{\infty}e^{-2(x^2+y^2)/w^2}dxdy} = \frac{w^2}{4}$$

Therefore, a beam radius used by ISO 11146-1:2021(en) is defined as:

$$w = 2\sigma_x$$

The beam diameter D4σ is two times the above beam radius, and an expression is as follows:

$$D4\sigma = 2w$$

In the embodiment of the present disclosure, a step of obtaining the center point linear energy and the welding process parameters is:

obtaining the center point linear energy, wherein an expression for the center point linear energy q is:

$$q = \frac{P_c}{v}$$

where $P_c$ is laser power of a center point light source, and v is the welding speed.

Further, an optimization constraint condition for the beam diameter D4σ is:

$$D4\sigma > \frac{h}{M_{col} * M_{focus} * 6.5}$$

Where h is the preset target penetration, $M_{col}$ represents a collimation coefficient, and $M_{focus}$ represents a focus imaging ratio.

An optimization constraint condition for the center point linear energy is:

$$q_{min} < q < q_{max}$$

where $q_{min}$ and $q_{max}$ are maximum and minimum center point linear energy under an empirical condition.

In the embodiment of the present disclosure, the preset ranges of the process parameters are obtained according to a working interval of each parameter of a welding system or process requirements.

In the embodiment of the present disclosure, the process parameter values are input into the optimization constraint conditions, the process parameters are retained when they simultaneously satisfy the optimization constraint conditions for the adjustable annular laser beam diameter and the center point linear energy, otherwise they are discarded, and a next group of process parameters is verified.

Figure 10:
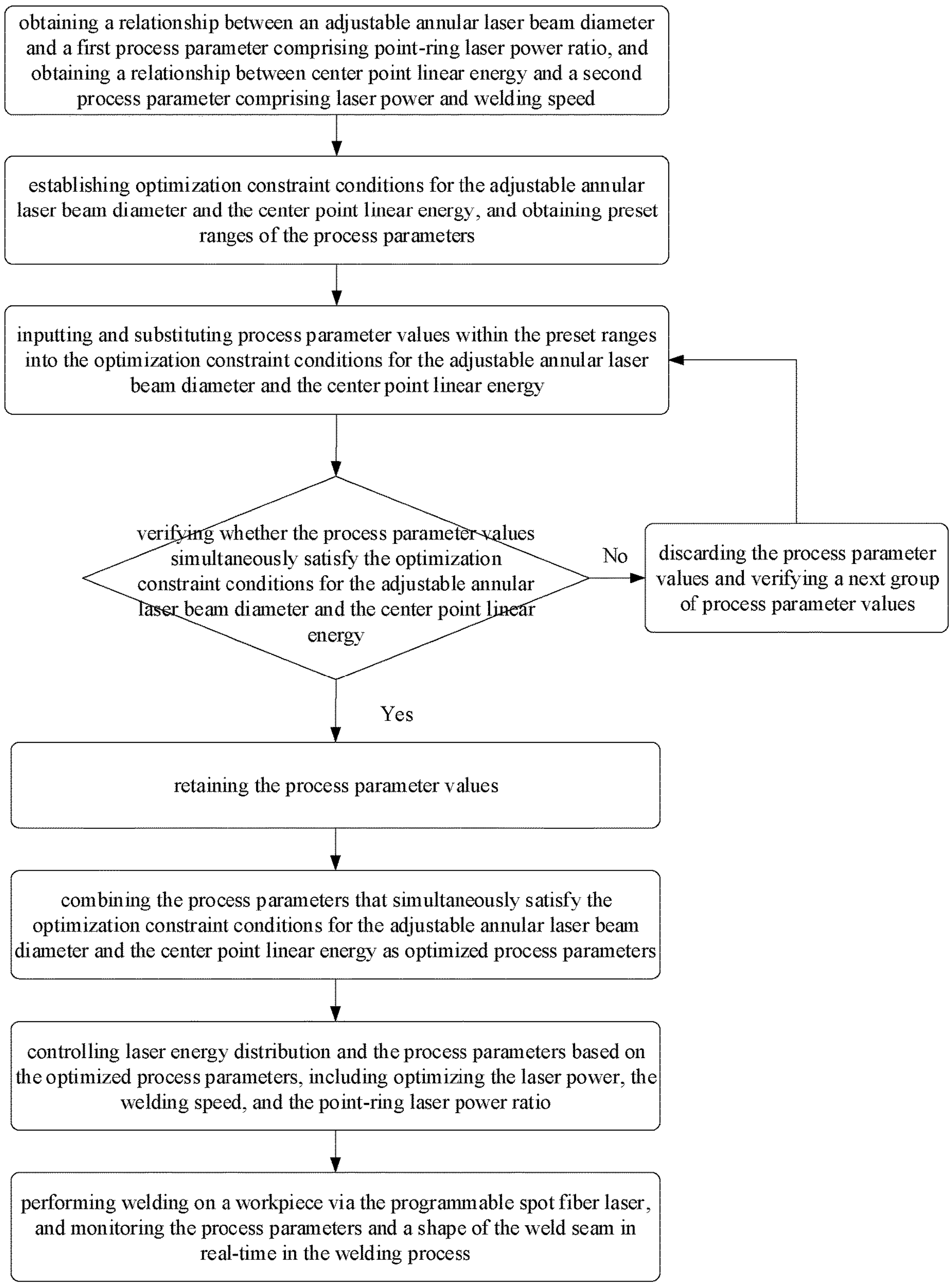
FIG. 10 is a flowchart illustrating a welding method for pore inhibition in high-power laser shaping welding based on optimized process parameters according to an embodiment of the present disclosure.

In an embodiment of the present disclosure, FIG. 10 schematically illustrates a flowchart of the welding method for pore inhibition in high-power laser shaping welding based on optimized process parameters according to the present disclosure.

Figure 2:
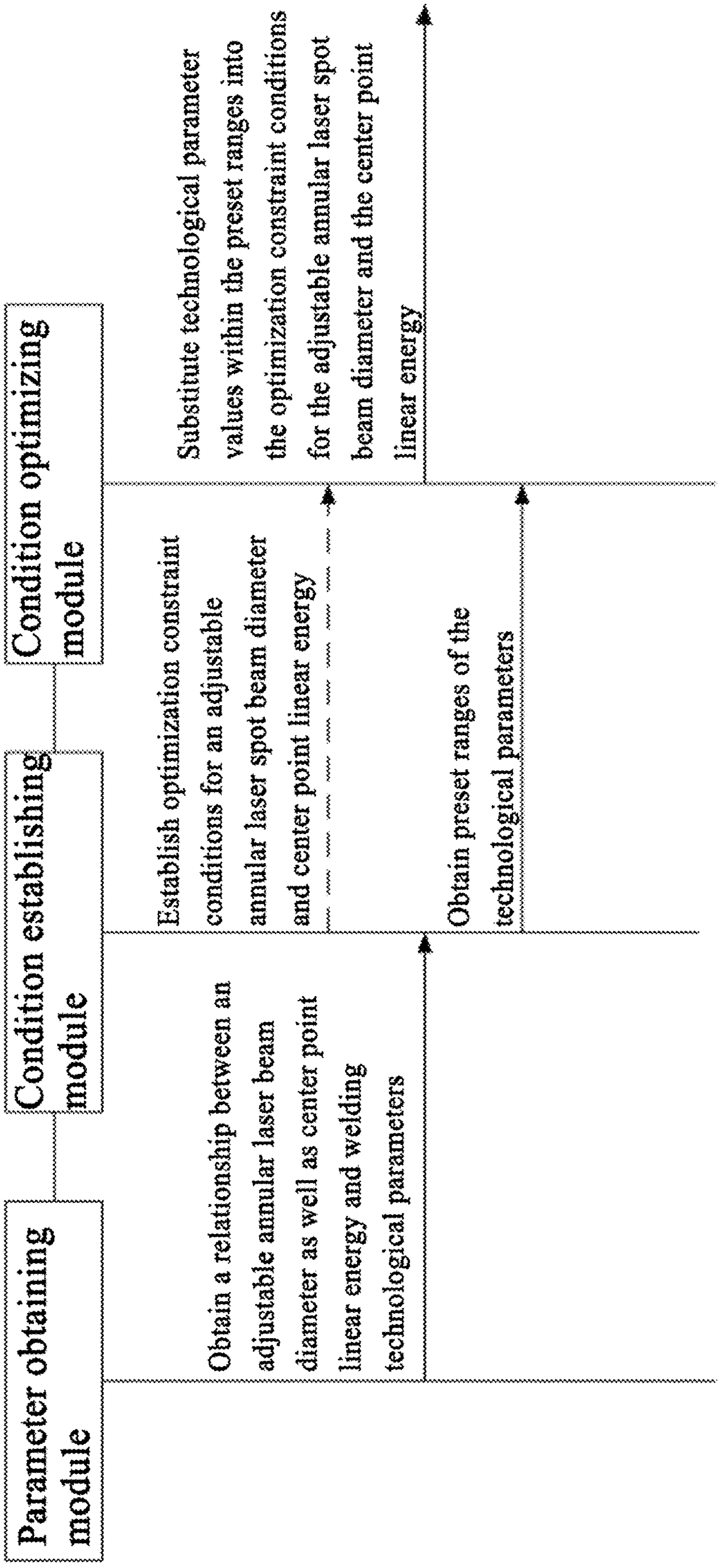
FIG. 2 is a schematic structural diagram of a system for optimizing process parameters for pore inhibition in high-power laser shaping welding provided by an embodiment of the present disclosure.

As shown in FIG. 2, a system for optimizing process parameters for pore inhibition in high-power laser shaping welding provided by an embodiment of the present disclosure includes:

a parameter obtaining module, configured to obtain a relationship between an adjustable annular laser beam diameter as well as center point linear energy and welding process parameters;

a condition establishing module, configured to establish optimization constraint conditions for the adjustable annular laser beam diameter and the center point linear energy; and configured to obtain preset ranges of the process parameters; and a condition optimizing module, configured to substitute process parameter values within the preset ranges into the optimization constraint conditions for the adjustable annular laser beam diameter and the center point linear energy, and then combine the process parameters that simultaneously satisfy the optimization constraint conditions for the adjustable annular laser beam diameter and the center point linear energy as optimized process parameters.

Figure 3:
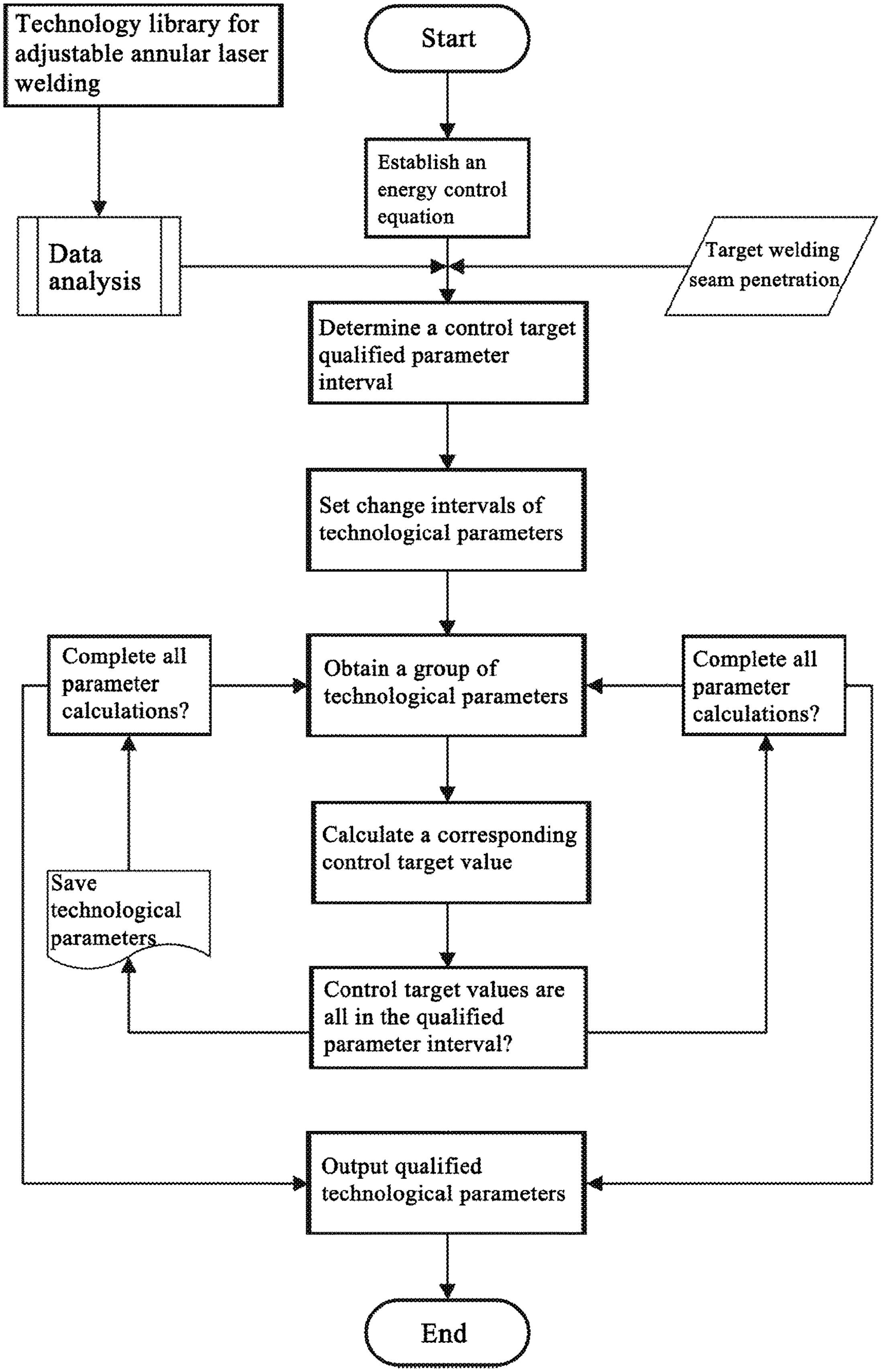
FIG. 3 is a flowchart of a method for optimizing process parameters for pore inhibition in adjustable annular laser welding provided by an embodiment of the present disclosure.
Figure 5:
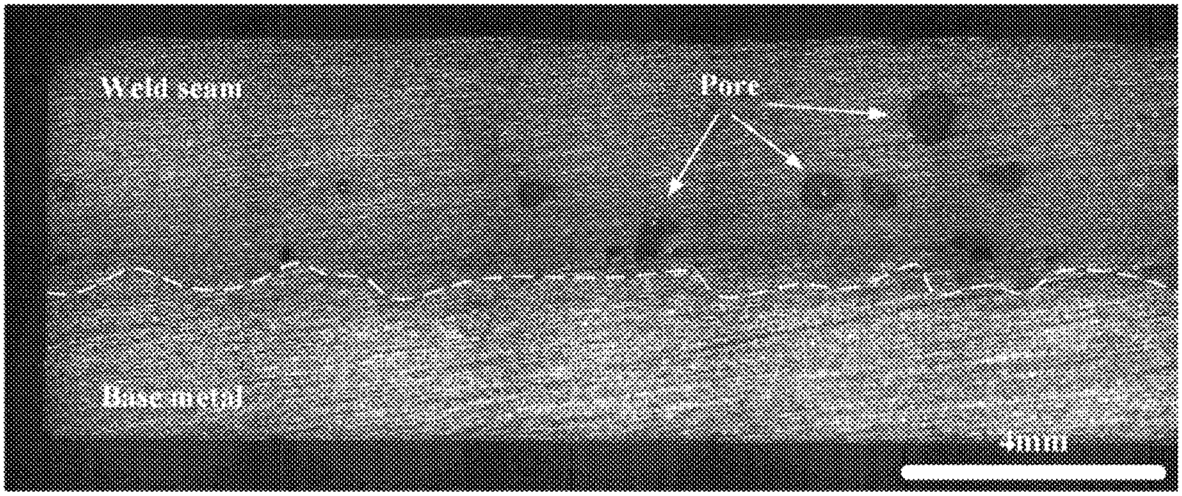
FIG. 5 is a diagram of welding defects in adjustable annular laser welding provided by an embodiment of the present disclosure.

Pore defects are one of the main defects occurring in the high-power laser welding process, which is particularly prominent in welding of an aluminum alloy medium-thick plate. The method in the present disclosure is described in detail below using the welding of an aluminum alloy medium-thick plate as an example. The high-power adjustable annular laser welding technology provides an effective means for pore inhibition in the welding process of the aluminum alloy medium-thick plate. However, the high-power adjustable annular laser welding technology changes the beam spatial energy distribution and situations where a point and ring laser energy coupling mechanism is not clear, the selection of process parameters has a great deal of blindness, and pore defects and a significant reduction in penetration as shown in FIG. 5 are prone to occur. The present disclosure proposes a method for precisely controlling a laser beam diameter and a beam spatial energy distribution to realize the optimization of a welding technology with a large penetration depth of a weld seam and small porosity, as shown in FIG. 1 and FIG. 3, the method in the present disclosure includes the following steps S1 to S4.

S1, a relationship between an adjustable annular laser beam diameter as well as center point linear energy and welding process parameters is obtained.

The process parameters in the present disclosure are mainly laser power, welding speed, and a point-ring laser power ratio.

Preferably, a step of obtaining the relationship between the adjustable annular laser beam diameter and the welding process parameters is as follows.

In this implementation, a CFX-8 kW programmable spot fiber laser from nLIGHT Laser is used. The power of the center point laser and the ring laser are adjusted proportionally. For example, when the laser power ratio ($P_c/P_r$) of the center beam to the ring beam=6:4, i.e., the center power $P_c$ is 60% of the total power, and the ring power $P_r$ is 40% of the total power.

Figure 4:
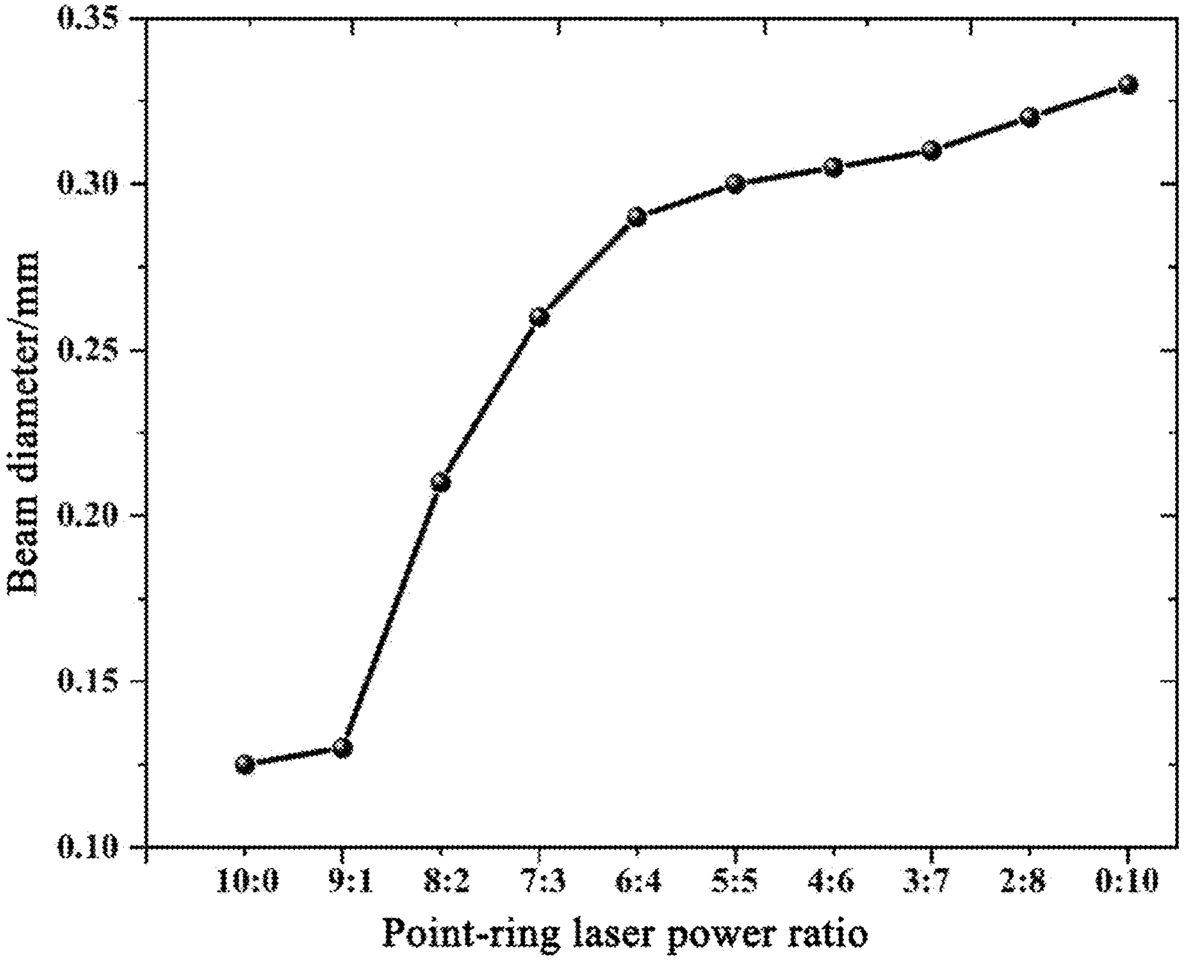
FIG. 4 is a diagram of a relationship between a point-ring laser power ratio and a beam diameter of adjustable annular laser welding provided by an embodiment of the present disclosure.

In this implementation, equivalent beam diameters for different point-ring laser ratios are shown in FIG. 4.

Figure 6:
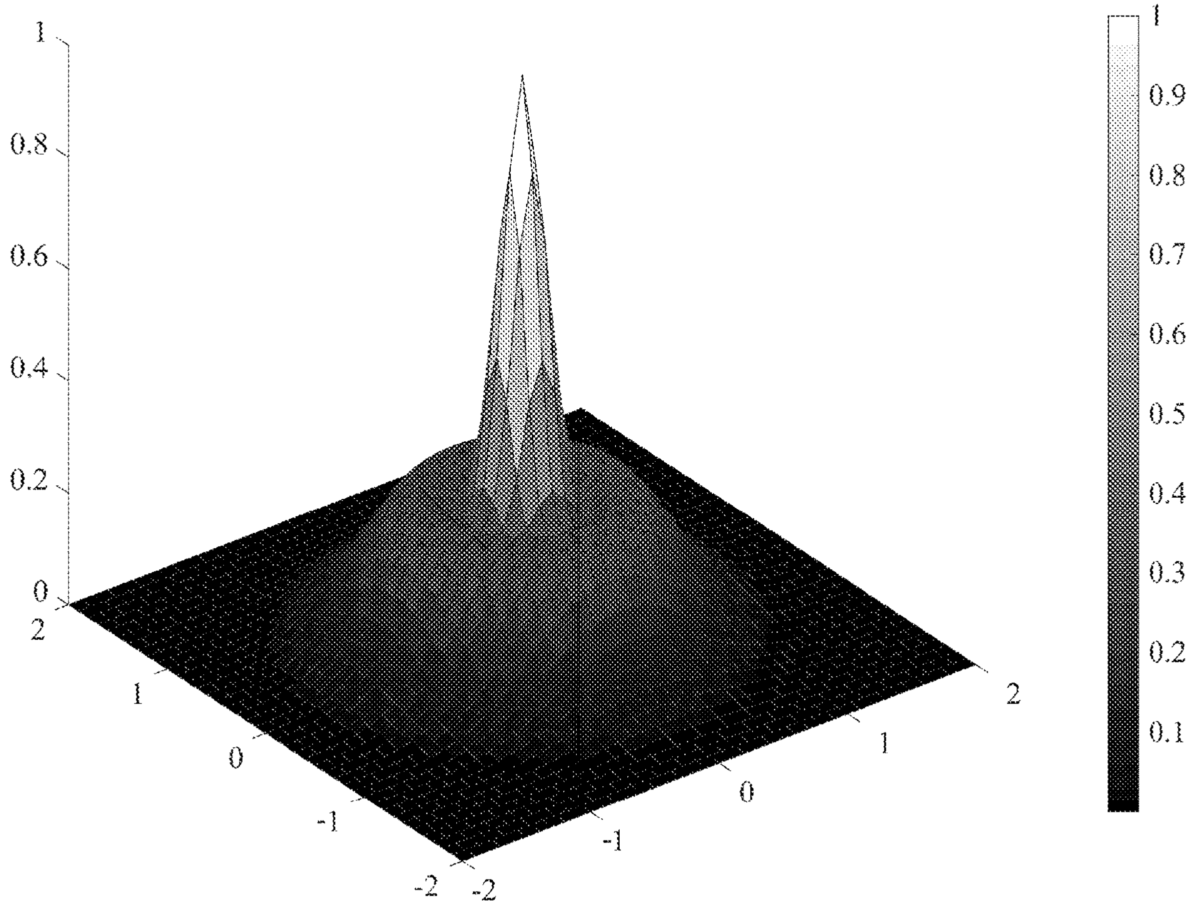
FIG. 6 is a three-dimensional schematic diagram of an energy density provided by an embodiment of the present disclosure.
Figure 7:
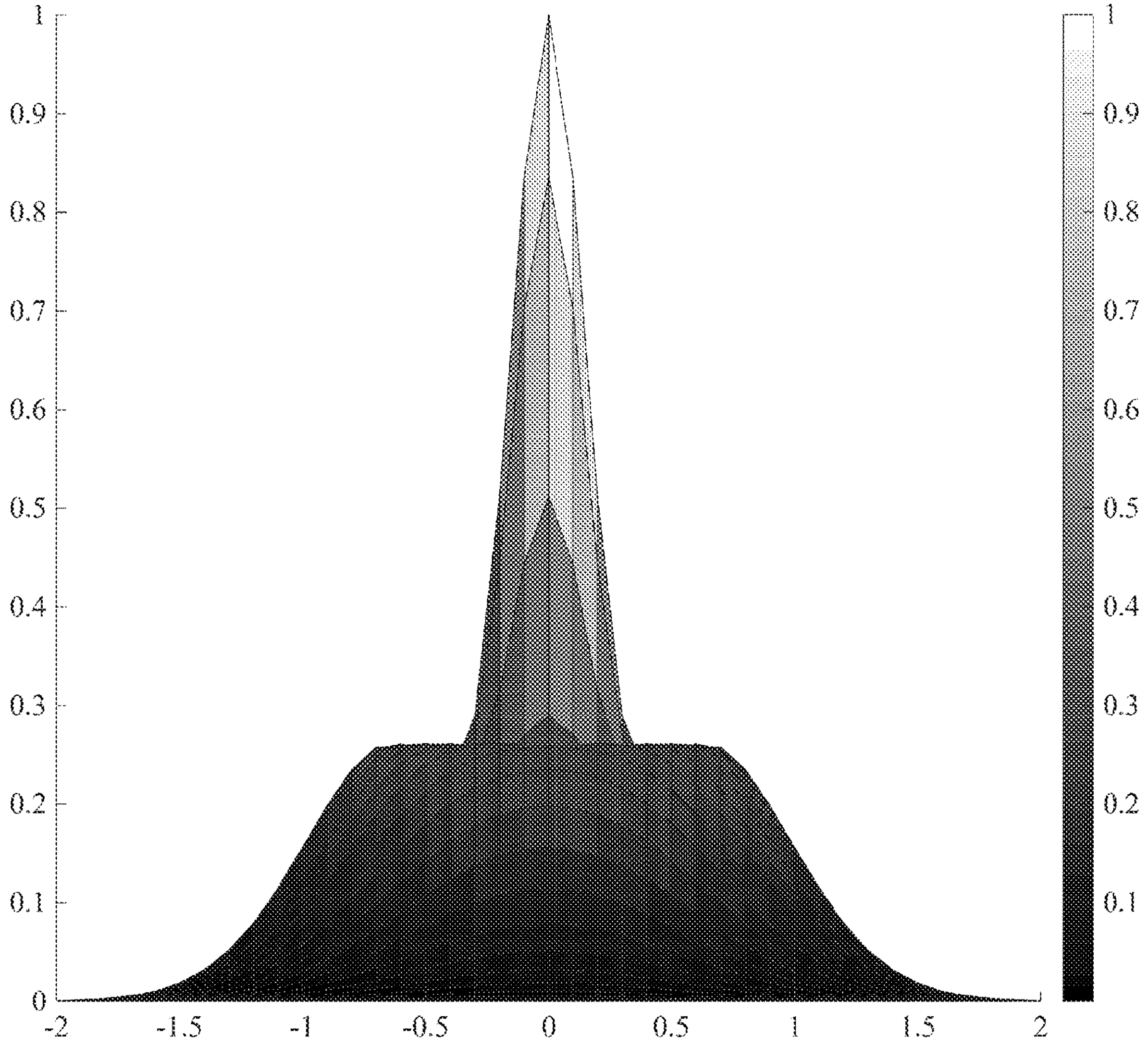
FIG. 7 is a schematic diagram of a front view section of an energy density provided by an embodiment of the present disclosure.
Figure 8:
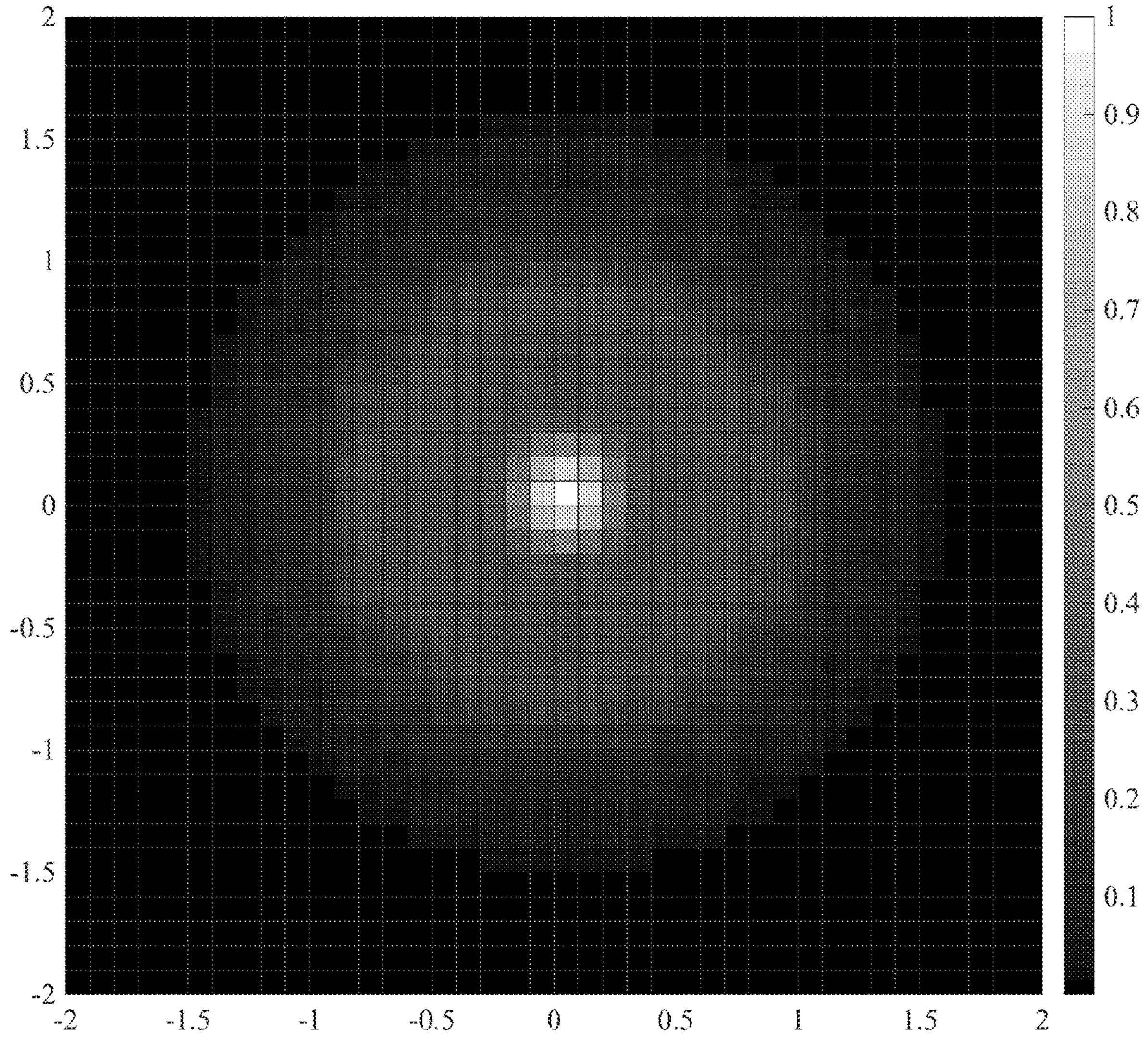
FIG. 8 is a schematic diagram of a top view section of an energy density provided by an embodiment of the present disclosure.

Linear energy q at the center of the weld seam is used as an index for evaluating the penetration. As shown in FIG. 6, FIG. 7 and FIG. 8, since the annular energy mainly acts on two sides of the weld seam and the depth of the keyhole is mainly maintained by vapor pressure, the center point linear energy of the weld seam is selected for evaluating the penetration of the weld seam, and the center point linear energy of the weld seam is shown as follows:

$$q = \frac{P_c}{v}$$

where $P_c$ is the laser power of a center point light source, and v is the welding speed.

S2: optimization constraint conditions for the adjustable annular laser beam diameter and the center point linear energy are established.

A minimum length of the adjustable annular laser beam diameter D4σ is determined. According to a theory of stability of a long liquid column, a perimeter of the small hole being greater than the depth of the small hole may realize the relative stability of the small hole. In addition, the diameter of a vapor capillary in laser beam welding is proportional to the diameter of a laser spot on the surface of an irradiated material.

According to experimental statistics, an optimization constraint condition for a penetration-to-beam diameter ratio is:

$$\frac{h}{M_{col} * M_{focus} * D4\sigma} < 6.5$$

where h is preset target penetration, $M_{col}$ represents a collimation coefficient, and $M_{focus}$ represents a focus imaging ratio, i.e. an optimization constraint condition for the adjustable annular laser beam diameter is:

$$D4\sigma > \frac{h}{M_{col} * M_{focus} * 6.5}$$

where in this implementation, $M_{col}$=1.75, and $M_{focus}$=1.5.

An optimization constraint condition for the center point linear energy is:

$$q_{min} < q < q_{max}$$

where $q_{min}$ and $q_{max}$ are maximum and minimum center point linear energy under an empirical condition.

S3, preset ranges of the process parameters are obtained.

An energy ratio threshold under the target penetration is obtained. Assuming that the target penetration of the experiment is 4.0-4.6 mm, then it may be obtained from the above constraint conditions that D4a in this embodiment needs to be greater than 0.27 mm, and according to the diagram of the relationship between the beam diameter and the point-ring laser power ratio provided in FIG. 4, it can be seen that a critical range of the point-ring laser power ratio in this embodiment is 6:4, i.e., a proportion of the ring shall not be less than 40%.

A center point linear energy interval under the target penetration is obtained. Since the center point linear line energy and the penetration of the weld seam are basically in a linear relationship, a correlation thereof may be established according to several groups of experiment results, so the linear energy interval can better ensure that the experimental results of the designed process parameters are near the target penetration.

Specifically, the ranges of the process parameters may be roughly selected according to an accessible range of a welding device or a range required in an actual operation process, to roughly obtain a change interval of the point laser power being $[P_{Cmin}, P_{Cmax}]$, a change interval of the welding speed being $[v_{min}, v_{max}]$, and a change interval of the point-ring laser power ratio being $[R_{min}, R_{max}]$.

Points in the above change intervals are substituted into the above optimization constraint conditions step by step in an interpolation manner, then parameter combinations that satisfy all the above constraint conditions are retained, otherwise the group of parameters is discarded, and verification and calculation for the next group of parameters are performed. In this way, a better process parameter combination corresponding to the target penetration may be selected from the above rough selection range, and selection may be made directly from the optima lprocess parameters for the next use, which is simple and convenient.

Figure 9A:
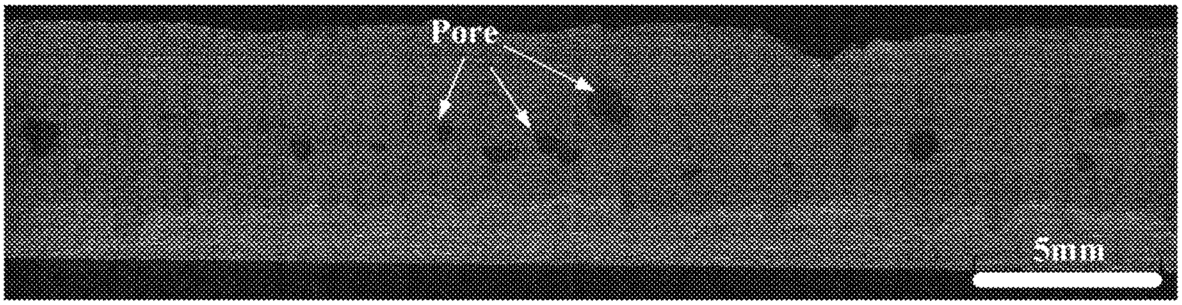
FIG. 9A schematically illustrates a schematic diagram of process parameters of pure Gaussian spot laser welding after welding.
Figure 9B:
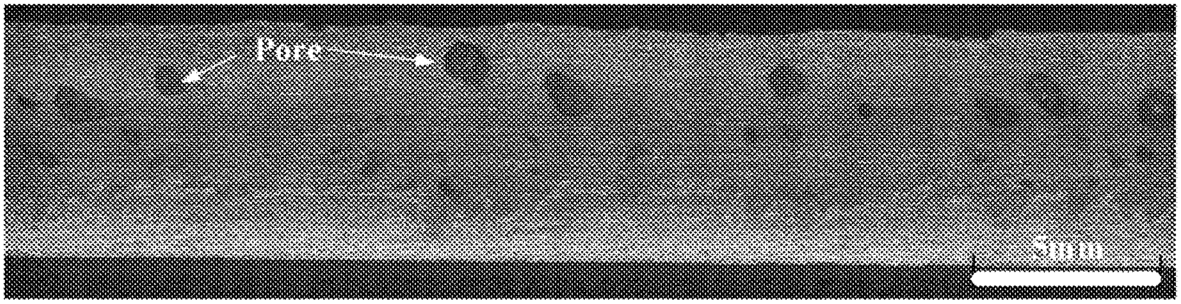
FIG. 9B schematically illustrates a schematic diagram of welding under a process parameter combination b of a common design.
Figure 9C:
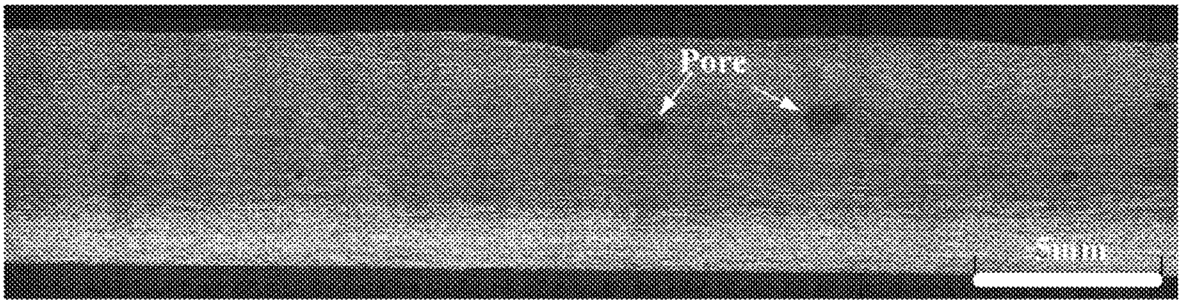
FIG. 9C schematically illustrates a schematic diagram of welding under an optimized process parameter combination c of the present disclosure.

A group of parameters designed by a pure Gaussian spot laser welding experiment is randomly selected, e.g., parameters a: total power of 3500 W, a welding speed of 40 mm/s, and a point-ring laser power ratio of 10:0. A group of parameters designed by a common experiment is randomly selected, parameters b: total power of 4290 W, a welding speed of 40 mm/s, and a point-ring laser power ratio of 7:3. A group of parameters designed by an optimized experiment is selected according to the present patent application, parameters c: total power of 6000 W, a welding speed of 60 mm/s, and a point-ring laser power ratio of 5:5. Welding experiments are performed respectively, and the shape of a longitudinal section of the weld seam is shown in FIG. 9A to FIG. 9C. The experimental results show that the process parameters optimized by this method have significantly lower porosity of the weld seam at similar penetration than the process parameters designed by common experiments.

The above method steps only list the design process of process parameters corresponding to the realization of the 6061 aluminum alloy in the specified penetration and ensuring less-pore welding, in fact, the method of the present disclosure is also applicable to process designs of other materials, e.g., when a welding base material is steel. The method of the present disclosure is also applicable to welding under other laser shaping conditions, e.g., Bezier beam laser welding.

In summary, the present disclosure starts by ensuring the stability of keyhole, a ratio of the penetration to the beam diameter is used as an index for evaluating porosity, and the linear energy at the center of the weld seam is used as an index for evaluating the penetration, and the adjustable annular laser beam diameter and the center point linear energy are used to establish a relationship with the process parameters to be optimized. By controlling the constraint conditions of adjustable annular laser beam diameter and the center point linear energy, constraints on the process parameters are realized, thus obtaining a plurality of groups of better process parameters, which may be used directly in engineering applications to realize the precise control of the beam diameter and the spatial distribution, inhibit the generation of pores in the welding process, and ultimately realize the welding with fewer pores, which significantly improves the welding quality and efficiency.

The foregoing are merely descriptions of the specific embodiments of the present disclosure, and the protection scope of the present disclosure is not limited thereto. Any modification, equivalent replacement, improvement, etc. made within the technical scope of the present disclosure by a person skilled in the art according to the spirit and principle of the present disclosure shall fall within the protection scope of the present disclosure.

What is claimed is:

1. A welding method for pore inhibition in high-power laser shaping welding based on optimized process parameters, comprising:

calculating, by a processor, a relationship between an adjustable annular laser beam diameter and a first process parameter comprising point-ring laser power ratio, and calculating, by the processor, a relationship between center point linear energy and a second process parameter comprising laser power and welding speed; wherein the adjustable annular laser beam is emitted by a programmable spot fiber laser;

retrieving, by the processor, a reference ISO 11146-1:2021(en) standard for the relationship between the adjustable annular laser beam diameter and the process parameters, for any spot laser beam, and defining D4σ as a beam diameter, wherein a calculation method is to solve a second-order moment of an intensity distribution function by using laser beam intensity information, and detailed calculation steps are as follows:

obtaining a light intensity distribution E (x, y) of an entire adjustable annular beam by adding a center Gaussian beam of intensity $E_c$(x, y) and an outer ring annular beam of intensity $E_r$(x, y):

$$E(x, y) = E_c(x, y) + E_r(x, y)$$

center coordinates ($x_c$, $y_c$) of the beam may be calculated as follows:

$$\sigma_x^2 \text{ and } \sigma_y^2$$

represent normalized weighted integrals of a power density distribution, and a calculation formula is as follows:

for a Gaussian beam with (0,0) as a center and a radius w, a formula is as follows:

a beam radius used by ISO 11146-1:2021(en) is defined as:

$$w = 2\sigma_x$$

the beam diameter D4a is two times the above beam radius, and an expression is as follows:

$$D4\sigma = 2w;$$

wherein an expression for the center point linear energy q is:

where $P_c$ is laser power of a center point light source, and v is the welding speed;

determining, by the processor, optimization constraint conditions for the adjustable annular laser beam diameter and the center point linear energy; and obtaining, by the processor, preset ranges of the process parameters;

wherein an optimization constraint condition for the beam diameter D4σ is:

where h is preset target penetration, $M_{col}$ represents a collimation coefficient, and $M_{focus}$ represents a focus imaging ratio;

an optimization constraint condition for the center point linear energy is:

where $q_{max}$ and $q_{min}$ are maximum and minimum center point linear energy under an empirical condition; and inputting, by the processor, process parameter values within the preset ranges into the optimization constraint conditions for the adjustable annular laser beam diameter and the center point linear energy, and then combining, by the processor, the process parameters that simultaneously satisfy the optimization constraint conditions for the adjustable annular laser beam diameter and the center point linear energy as optimized process parameters; and controlling, by a laser controller, laser energy distribution and the process parameters based on the optimized process parameters, and performing welding on a workpiece via the programmable spot fiber laser.

2. The welding method for pore inhibition in high-power laser shaping welding based on optimized process parameter according to claim 1, wherein the preset ranges of the process parameters are obtained by the processor according to a working interval of each parameter of a welding system or process requirements; and the process parameter values are input by the processor into the optimization constraint conditions, the process parameters are retained by the processor when they simultaneously satisfy the optimization constraint conditions for the adjustable annular laser beam diameter and the center point linear energy, otherwise they are discarded by the processor, and a next group of process parameters is verified by the processor.

3. The welding method for pore inhibition in high-power laser shaping welding based on optimized process parameters according to claim 1, wherein the controlling step comprises optimizing the laser power, the welding speed, and the point-ring laser power ratio by the processor.

4. The welding method for pore inhibition in high-power laser shaping welding based on optimized process parameters according to claim 1, further comprising monitoring, by a sensor coupled to the processor, the process parameters and a shape of the weld seam in real-time during welding.

* * * * *